(No Model.)
W. McNARY.
SULKY PLOW.
No. 295,788. Patented Mar. 25, 1884.
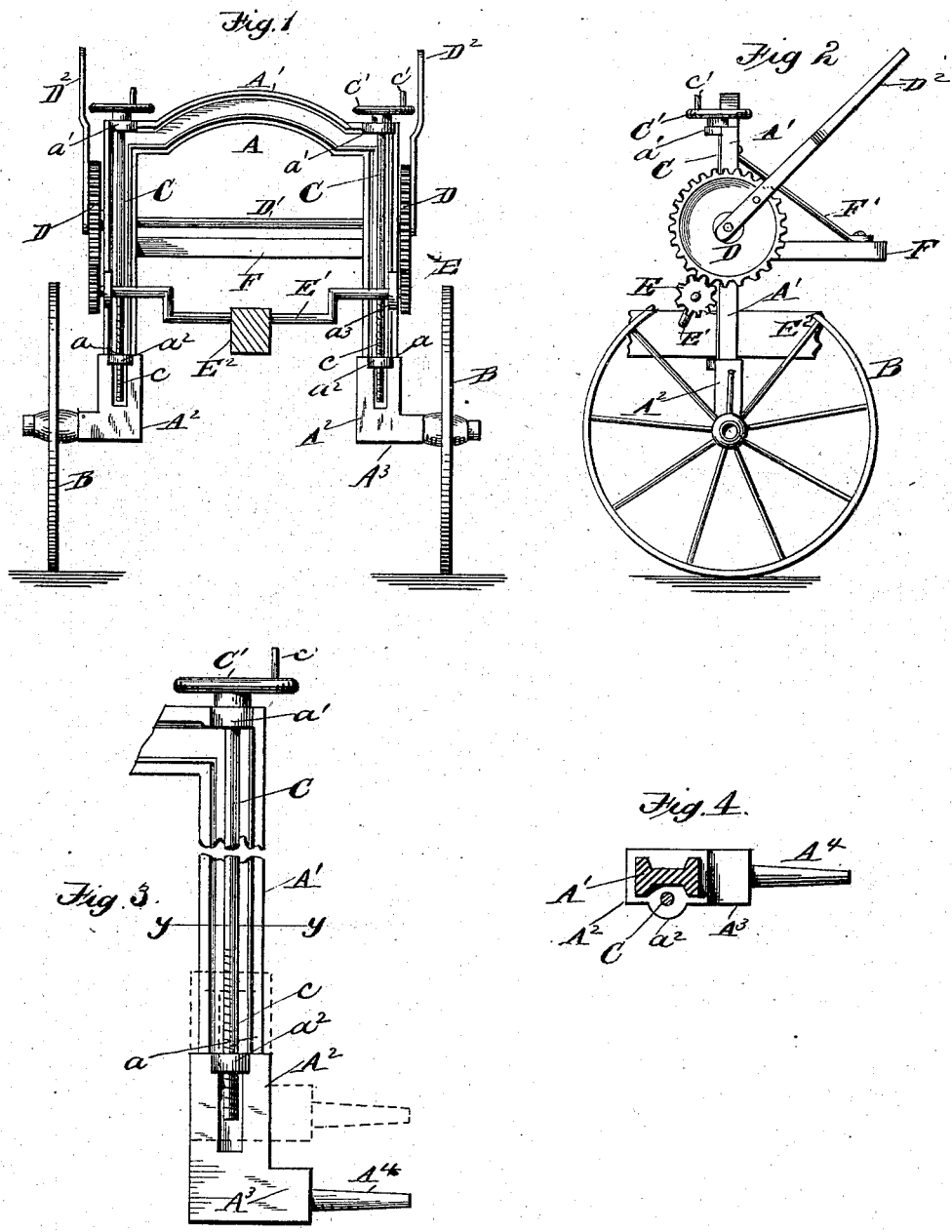

UNITED STATES PATENT OFFICE.

WILLIAM McNARY, OF BRYAN, OHIO.

SULKY-PLOW.

SPECIFICATION forming part of Letters Patent No. 295,788, dated March 25, 1884.

Application filed July 6, 1883. (No model.)

*To all whom it may concern:*

Be it known that I, WILLIAM MCNARY, a citizen of the United States, residing at Bryan, in the county of Williams and State of Ohio, have invented certain new and useful Improvements in Sulky-Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain improvements in sulky-plows, and has for its object the provision of a simple, durable, and easily-operated sulky-plow provided with means whereby the plow proper may be kept in a vertical plane and at a point equidistant from the sulky-wheels and adapted to be used upon either hill-sides or level ground.

To the accomplishment of the above-named object, it consists in the construction, combination, and arrangement of the various parts of said plow, substantially in the manner hereinafter described and claimed.

Referring to the drawings, in which similar letters of reference denote similar parts, Figure 1 represents a rear elevation of my invention detached from the pole or tongue, and having a portion of the plow-beam in position for use. Fig. 2 represents a side elevation of that portion of my improvement shown in Fig. 1. Fig. 3 represents an enlarged detail view of one side of the supporting-frame, and shows the means employed to raise and lower the wheels as desired. Fig. 4 is a transverse sectional view taken on the line $y\,y$ of Fig. 3.

In the drawings, A represents the frame, consisting of the parts A' and $A^2$, the upper part, A', being arched, or in form of inverted letter U, (see Fig. 1,) its ends $a$ entering and passing downward through the lower parts, $A^2$, of the frame. Said portions $A^2$ are each provided at their lower ends and upon their outer surfaces with offsets or projecting portions $A^3$, that terminate in trunnions $A^4$, for the purpose of mounting the frame and its attached plows upon wheels B. The portion A' of the frame is in cross-section the shape of a double T-rail, said portion A' being provided at its upper rear surface, upon each side thereof, with bosses $a'$, through which pass rods C, screw-threaded at their lower ends, as shown at $c$, said screw-threaded portions passing through projections $a^2$, attached to the upper rear sides of the portions $A^2$ of the frame. The rod C is provided at its upper end with hand-wheels C', having hand-cranks $c'$. When it is desired to raise or lower the wheels B, the rod C is rotated back or forth, as will be readily understood.

D represents spur-gear wheels, mounted at each side of the frame A upon the ends of a shaft, D', which passes through said frame. Each of said wheels is provided with hand-levers $D^2$, whereby they may be rotated and made to engage with and rotate gear-pinions E, mounted upon the ends of a crank-shaft, E', journaled in bearings $a^3$ at each side of the frame A'.

$E^2$ represents the plow-beam, attached or hung upon the crank-shaft E', at the middle thereof, as shown.

F represents a bail attached at its ends to each of the sides of the frame A', and supported by brace-rods F', the purpose of said bail and brace-rods being to attach the plow-sulky to tongue or draft-rod.

I do not limit myself to the precise form of attachment to the tongue or draft-rod shown and described, inasmuch as a plow may be attached in many ways to such tongue or draft-rod not herein shown or described. Also, I have not deemed it necessary to show fully any particular form of plow, as any form of sulky-plow may be used.

The operation of my improvement will be readily understood from the foregoing description, it being understood that either or both of the wheels may be raised or lowered at one and the same time.

I do not limit myself to the exact construction shown and described, as I am aware that modifications can be made without departing from the principle or sacrificing the advantages of my invention. I would therefore have it understood that I claim the privilege of making such changes in the form and proportion of parts composing my invention as fairly fall within its scope.

It is obvious that only one of the levers D² may be used.

Having thus described my invention, I claim—

1. In a sulky-plow, the two-part frame A, consisting of the upper arched or U-shaped portion, A', and lower parts, A², the latter slotted or recessed to receive the ends of the former, in combination with the rods C, secured in bosses at their upper ends, and having their lower ends threaded to engage with threaded nuts or projections on the parts A², and means for operating said rods, as and for the purpose set forth.

2. In a sulky-plow, the combination of a two-part frame, A, constructed substantially as described, and provided with adjusting-rods C, with spur-wheels D, mounted upon the shaft D', and having hand-levers D², pinions E, mounted upon the crank-shaft E', having its bearings in the adjustable part of the frame, and plow-beam E², substantially as described.

In testimony whereof I affix my signature in presence of two witnesses.

WILLIAM McNARY.

Witnesses:
  W. O. JOHNSTON,
  W. A. HITT.